United States Patent [19]

Shepard

[11] Patent Number: 5,140,139
[45] Date of Patent: Aug. 18, 1992

[54] PREPARING MARK/READ DOCUMENTS WITH MARKABLE BOXES AND LOCATING THE BOXES FROM THE DOCUMENT SCAN DATA

[75] Inventor: David H. Shepard, Coronado, Calif.

[73] Assignee: Cognitronics Corporation, Stamford, Conn.

[21] Appl. No.: 737,695

[22] Filed: Jul. 30, 1991

Related U.S. Application Data

[63] Continuation of Ser. No. 440,682, Nov. 13, 1989, abandoned.

[51] Int. Cl.⁵ .................. G06K 7/14; G06K 9/20
[52] U.S. Cl. .................. 235/456; 235/454; 382/48; 395/149
[58] Field of Search ............ 235/454, 456; 382/1, 382/48, 61, 68, 69; 358/474, 487, 494, 496; 395/149, 150

[56] References Cited

U.S. PATENT DOCUMENTS

| | | | |
|---|---|---|---|
| 4,322,754 | 3/1982 | Mason | 235/456 X |
| 4,402,088 | 8/1983 | McWaters et al. | 382/68 |
| 4,504,969 | 3/1985 | Suzuki et al. | 382/10 |
| 4,641,358 | 2/1987 | Archambeault et al. | 382/68 |
| 4,736,109 | 4/1988 | Dvorszak | 250/566 |
| 4,760,246 | 7/1988 | Shepard | 235/454 |
| 4,760,247 | 7/1988 | Keane et al. | 235/454 |
| 4,877,948 | 10/1989 | Krueger | 235/449 |
| 4,937,439 | 6/1990 | Wanninger et al. | 235/456 |

Primary Examiner—Stuart S. Levy
Assistant Examiner—Edward H. Sikorski
Attorney, Agent, or Firm—Parmelee, Bollinger & Bramblett

[57] ABSTRACT

A "mark read" document is prepared with a pattern of boxes within which marks may selectively be entered, together with printed characters for instructions or other informational purposes. The characters and boxes both are formed on the sheet with printing material having an optical spectrum capable of detection by the optical sensing device to be used for scanning the document. A template sheet then is prepared to present only the pattern of boxes as they appear on the original sheet, without any characters. This template sheet is passed through a computer-controlled optical scanner which examines the pattern of boxes and stores in the computer memory numbers representing coordinates identifying the location of each box. Later, completed (marked) sheets of the original type are passed through the optical scanner which produces and stores in the computer memory a set of rectilinear scan data in the form of binary bits representing pixels (picture elements) defining the entire image presentation on the sheet, i.e. the characters and the boxes. This scan data is analyzed in accordance with a program of the associated processing computer to locate each box. The stored data bits corresponding to the interior of each box are then examined to determine whether the box contains a mark.

8 Claims, 3 Drawing Sheets

*Fig. 1.*

```
                                                          ▫ ─── 30
             SAMPLE COMMUNITY COLLEGE    } ─── 12
             STUDENT PROGRESS FOLLOWUP   }
To:   DR. SAMUAL EVANS            FOR: BUSINESS 3A
      CHAIR                            PROB. AND STATISTICS  ─── 32
                                       3:00 M W F

RE:   Pretzel  Bob B.                  SSN#: 1212388126
                                                          ─── 12
```

The above named student is attending Sample Community College. Your information regarding his/her performance will be helpful in guding him/her toward academic success. Please complete this form and return it to Data Services within one week. Thank you for your assistance.

QUESTION                         RESPONSE                     ─── 14

* STUDENT PERFORMANCE *

1) APPROXIMATE GRADE TO DATE    ▫   ▫   ▫   ▫   ▫   ▫   ▫
                                A   B   C   D   F   CR  NC

2) EFFORT / ATTITUDE            ▫   ▫   ▫   ▫
                                E   A   S   F

3) % OF ASSIGNMENT COMPLETED    ▫   ▫   ▫   ▫
                                100 75  50  40

4) ATTENDANCE                   ▫   ▫
                                S   U

* RECOMMENDED SERVICES *

5) TUTORING                     ▫   ▫
                                Y   N

6) STUDYING / WRITING           ▫   ▫
                                Y   N

7) VERBAL / ORAL                ▫   ▫
                                Y   N

8) SUPPORT SERVICES             ▫   ▫
                                Y   N

* ADDITIONAL INFORMATION *

9) CONTACT INSTRUCTOR           ▫   ▫
                                Y   N

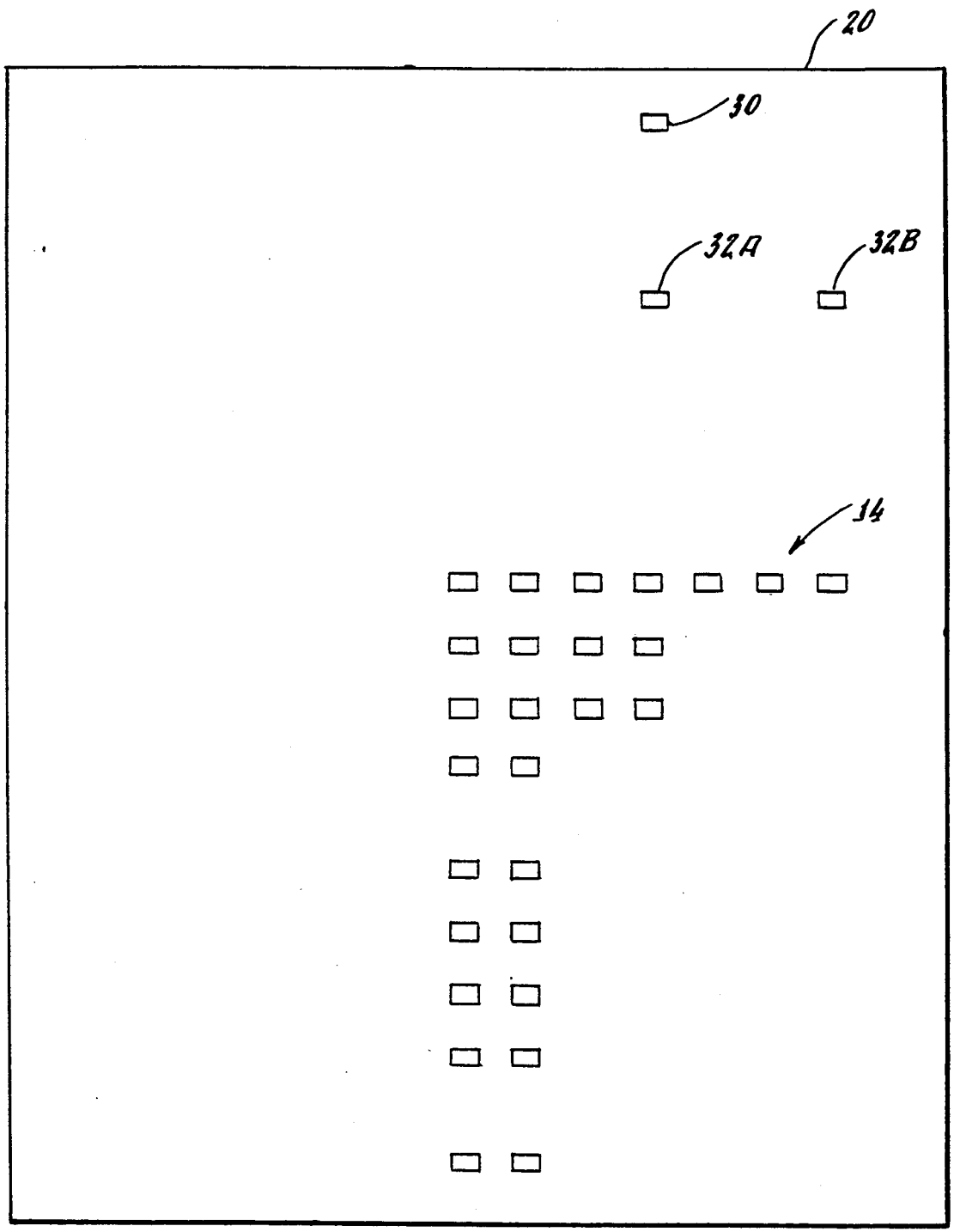

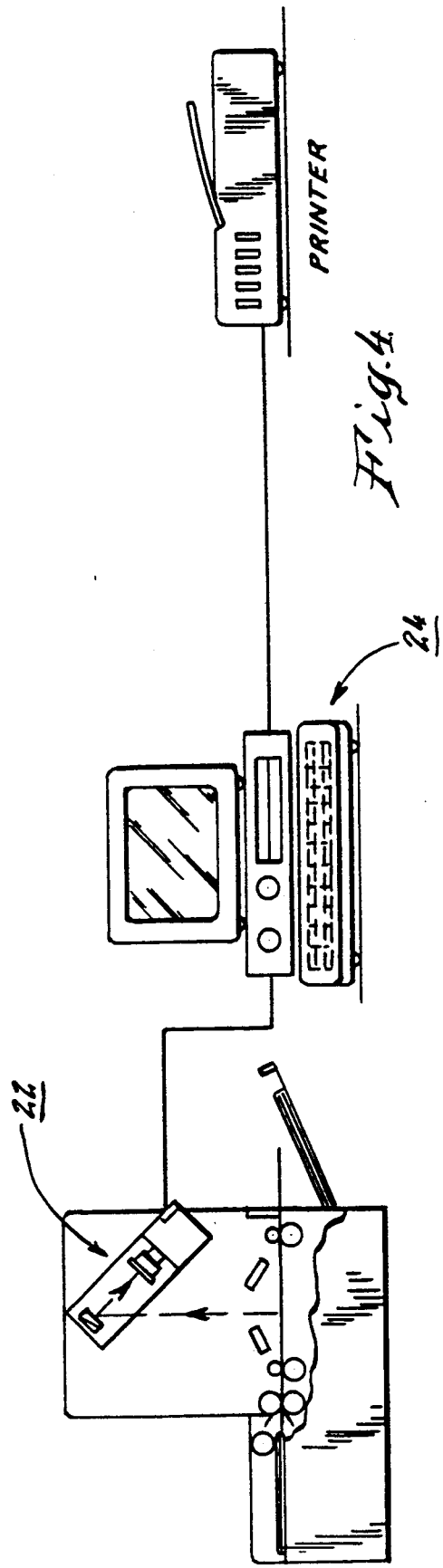

PREPARING MARK/READ DOCUMENTS WITH MARKABLE BOXES AND LOCATING THE BOXES FROM THE DOCUMENT SCAN DATA

This application is a continuation of Ser. No. 440,682, as filed on Nov. 13, 1989, now abandoned.

BACKGROUND OF THE INVENTION

1. Field of the Invention

This invention relates to mark reading systems used in obtaining information from groups of people by having the individuals (respondents) fill in pre-printed forms by placing marks in selected boxes on the forms which are then scanned and analyzed by optical mark reading (OMR) equipment. More particularly, this invention relates to techniques for generating the pre-printed forms more easily and economically than heretofore, and for automatically reading such forms more reliably than heretofore.

2. Description of the Prior Art

Pre-printed mark read documents have been used for many years, for example, in the form of answer sheets for multiple-choice tests for students. Conventionally, the completed answer sheets are processed by automatic test scoring devices including optical mark reading apparatus.

Typically, the pre-printed forms carry alphanumeric characters together with associated boxes in selected ones of which the respondent will insert marks, to indicate his response. A stack of completed forms can be processed rapidly by optical sensing equipment. A computer associated with the scanner carries out a program to determine the responses selected by each person and to compile a summary or other analysis of the results.

One of the problems with such mark read systems is that preparation of the pre-printed sheets is undesirably costly. Another problem with such systems is that too many sheets are rejected during automatic processing due to failure of forms to meet specifications in spite of costly preparation.

Present systems in use today ordinarily print the boxes in drop-out ink, i.e. ink that is (for the particular scanning beam wavelength) not reflectively (or transmissively) different from the background of the sheet, and that therefore will not be "seen" by the optical scanning beam. Reference may be made to U.S. Pat. No. 4,217,487 and Re 29,104 for further information on such drop-out inks. In such systems, the boxes are seen visually by the person filling out the form, but the optical scanning apparatus does not "see" the box and simply examines the region of the document where it is instructed to look for a mark.

The regions to be examined for marks in such prior art systems are identified to the OMR equipment by external controls which may differ from system to system. One common approach makes use of so-called timing marks which are pre-printed at intervals down one side edge of the document. See, for example, U.S. Pat. No. 3,900,961. Through the scanning of such timing marks, the scanner determines in accordance with pre-set instructions where to look for a possible mark inserted by a person filling out the form, and makes a record of each mark so found.

It is known that certain difficult-to-control variables can cause unsatisfactory operation of such a system. For example, the drop-out ink printing on the document can be out of registration, causing the respondent and the optical mark reader (OMR) to be looking at two different locations for (1) placement and (2) detection of a mark. That is, the OMR equipment will, in such case, examine a region different from that identified by the printed box. Errors can be so large in some instances as to completely miss the mark or pick up a mark from an adjacent box. Printing the documents to tighter tolerances can improve performance, but is still more costly.

SUMMARY OF THE INVENTION

In one preferred embodiment of the present invention, to be described hereinbelow in detail, mark read documents are prepared by placing printed characters on a sheet together with a pattern of boxes within which marks may selectively be entered by the respondent. The characters and boxes are both formed on the sheet with printing material of an optical spectrum detectable by optical sensing subsequently used for scanning the sheet for detection of marks. No drop-out ink need be used.

The pattern of boxes developed on the sheet first is analyzed to determine and store in a computer memory respective numbers representing coordinates of the box locations. The sheet then is passed through an optical scanner controlled by the computer in such a way as to produce and store in memory a set of scan data representing the entire document. This scan data is in the form of binary bits representing pixels (picture elements) defining the complete visual presentation on the sheet, i.e. both the printed characters and the boxes. Further information regarding the development of such scan data may be found in U.S. Pat. Nos. 3,582,884 and 4,760,246, both issued to the present inventor.

This stored scan data then is analyzed in accordance with a program of the associated computer. In one part of this program, those portions of the stored scan data corresponding to the regions at and adjacent the previously-stored coordinates of the box locations are examined to verify the existence of each box and to determine its exact location. Thereafter, the stored data bits corresponding to the interior of each box are examined to determine whether the box contains a mark.

The invention has two important advantages. First, the OMR apparatus decides where to look for marks using the same criterion used by the respondent in placing the mark. Second, if a box is not found or is found to be defective, errors will be detected which otherwise could be missed.

Other objects, aspects and advantages of the invention will in part be pointed out in, and in part apparent from, the following detailed description of a preferred embodiment of the invention, considered together with the accompanying drawings.

BRIEF DESCRIPTION OF THE DRAWINGS

FIG. 1 presents an exemplary mark read document for carrying out the invention;

FIG. 2 shows a template sheet derived from the document of FIG. 1, presenting only the pattern of boxes;

FIG. 3 shows a small portion of another type of mark read document; and

FIG. 4 is a diagrammatic showing of a generalized computer-controlled mark read system suitable for carrying out the invention.

DESCRIPTION OF A PREFERRED EMBODIMENT

Referring first to FIG. 1, a document 10 is printed with alphanumeric characters such as shown at 12 (and elsewhere) to give the respondent suitable information regarding the document, such as an explanation of the category of data to be obtained from filling in the boxes 14 making up the pattern of boxes. The characters 12 and the boxes 14 may for example be printed with a laser printer, in known fashion. Thus, the characters and boxes, and marks placed in the boxes by any means such as pen or pencil, can be detected by any scanning beam with a spectrum in the human optical range as opposed to a beam of particular spectrum such as red, or worse, infra-red which is not in the human visible range and which therefore may see an image different from that seen by the respondent.

FIG. 2 shows a template sheet 20 which is prepared from the document of FIG. 1 to present the pattern of boxes as they appear on the original document, without the other characters. This template sheet is passed through a computer-controlled optical mark reading apparatus such as illustrated in FIG. 4, and as described in more detail in the above-mentioned U.S. Pat. No. 4,760,246. This apparatus is controlled by a computer program including a sequence which instructs the apparatus to scan the template 20 and to determine and record the location of each of the boxes 14. That is, as the scanner 22 detects the printed material forming each box, the corresponding scan signal is sensed by the computer 24 which in turn generates a corresponding set of numbers (vertical and horizontal coordinates) identifying the place on the sheet where the box was detected. These coordinates may for example identify the location of the upper left-hand corner of each box. If the box sizes may vary, further coordinates can be stored to provide information regarding the actual boundaries of each box.

Where there are boxes in a row, they are horizontally aligned. The first box encountered in scanning of the template sheet 20 is used as an initial reference. Vertical box coordinates preferably are determined as a difference dimension (or "delta") from the last box (or row of boxes) above each newly-found box (or row of boxes). Horizontal coordinate dimensions may be absolute, as measured from the left-hand edge of the machine scanning field, although delta horizontal coordinates could be employed with some advantage.

The coordinates of the boxes 14 can be determined in ways other than by forming a template sheet. For example, the original document 10 can be scanned in its entirety to develop a set of scan data to produce a corresponding image presentation on a CRT associated with the computer. A cursor marker can then be manually positioned so as to overlay a selected element of each box. The coordinates of the positions of the cursor at each box can then be recorded in the computer memory to indicate where the boxes are.

After determination and storing of all of the box coordinates, original document 10 is (after being marked) inserted into the scanner apparatus of FIG. 4 and scanned as described in the above-mentioned U.S. Pat. No. 4,760,246, under control of a subsequent portion of the computer program. In this program portion, the leading edge of the document is first detected by the scanner 22, and thereafter all of the data developed by the scanning beam is stored in the computer memory.

Since detection of the leading edge of a document is not entirely reliable, a special control character such as the box 30 is printed near the top of the document, as the first item to be scanned after the leading edge. It is not necessary to use a box for this purpose, and any type of reliably positioned character can be used, such as an alphanumeric character. In any event, the computer 24 analyzes the configuration of this first-encountered character, and if it meets specified requirements, the scanning and storing of scan data continues.

In some cases the reading of the document 10 will require an OCR function, i.e. optical recognition of information characters on the document (such as the serial number shown at 32 on FIG. 1). In that case, some means must be provided for identifying the field where the characters are to be found. For example, the location of the serial number 32 is identified on the template sheet 20 by a pair of horizontally aligned boxes 32A, 32B giving the positions of the starting and ending characters to be recognized optically. The computer program is provided with instructions regarding where such OCR-identifying boxes will be found.

In any event, the scanning carried out by the scanner 22 effectively examines the printed material in a series of closely-spaced horizontal scan lines each extending side-to-side across the sheet, as described in U.S. Pat. No. 4,760,246. The scan lines may for example be spaced 0.0008" apart vertically. The scan data along each line is formulated as a series of binary bits indicating whether or not the corresponding spot on the document contains a pixel (picture element). The spots represented by the binary bits have the same spacing as the scan lines (e.g. 0.0008"). Thus, a set of rectilinear scan data is developed. This data is stored in the computer memory so as to permit ready subsequent analysis as will be described.

After all of the rectilinear scan data has been stored in the computer memory, it is analyzed in accordance with a further portion of the computer program. More specifically, the stored scan data is examined to look for fields specified by the box coordinate data obtained from scanning of the template document 20. The fields specified may be images for OCR or for transfer to a display storage, but the processing of such data is not a necessary part of the present invention and therefore will not be described herein. The principal field of interest here is that of a box to be marked by a respondent. In that case, only a single set of box coordinates identifies the location of each box to be examined.

In accordance with the computer program, portions of the stored scan data corresponding to the projected location of each box (and the region immediately adjacent thereto) is searched for pixels. That is, the stored scan data is checked at (and adjacent) the locations identified by the stored box coordinates. When pixel bits are found in such examination, they are tested in accordance with specified logical rules to verify that they represent a box. For example, for rectangular boxes the logic may check whether there are a specified number of vertical pixels, a specified number of horizontal pixels, and whether one end of the horizontal pixels is contiguous with one end of the vertical pixels. If no box is found within the region searched, an error signal is developed to indicate that the document must be separately examined to determine what went wrong.

When a box has been detected, a fresh entry is made in the computer memory to identify its new-found exact location by vertical and horizontal coordinates. These new location coordinates subsequently are used for determining the region of the scan data to be searched for the following row of boxes. That is, the previously stored delta dimension for the vertical distance from the already-found row to the next following row is applied to the newly-stored coordinates for determining the location of the portion of the set of data bits to be searched for pixels representing the next following row of boxes.

However, before that sequence is initiated, the already-located box is analyzed to determine whether it contains a mark. For this purpose, the stored data bits corresponding to the interior of the box are examined to determine whether any are black pixels and, if so, whether such pixels are sufficient in number to represent a mark. If a mark is found, a corresponding entry is made in the computer memory, indicating the box number (counting from left to right, top to bottom) where the mark has been found.

Important to the success of this new OMR process is the provision of adequate tolerances in the field searches to allow for paper shrinkage, printing location variance, document feeding skew and feeding motion irregularity. Various techniques can be used to achieve this result. For example, it can be done by storing the positions in which the search for a box is started five pixels away from where it is expected to be found. The coordinate base of each found box may then be readjusted to the location actually found for the next search. Thus, tolerance problems are not cumulative if there has been paper shrinkage or expansion.

Many mark read documents have quite small boxes to be marked, and the boxes can be quite close together. This is often true of student answer sheets, where there may be a large number of questions requiring response. A portion of such an answer sheet is illustrated in FIG. 3, wherein each numbered row contains 5 boxes for selecting any of 5 possible answers to a corresponding question. With small boxes, the student typically will be requested to fill in the entire box, such as is shown at 40. Such a filled box, where the mark reaches out to the box boundaries, can be detected in accordance with the present invention, by examining the stored scan data as described above for pixels representing the boundaries of the box, and then examining the data bits representing any pixels within the boundaries.

Although a specific preferred embodiment of the invention has been shown and described herein in detail, it is desired to emphasize that this has been for the purpose of illustrating the invention, and should not be considered as necessarily limitative of the invention, it being understood that many modifications can be made by those skilled in the art while still practicing the invention claimed herein.

What is claimed is:

1. A method of preparing and reading documents carrying written material together with at least one box having boundaries within which a mark may be entered by a person who processes the document for the purpose of alternatively marking said box or leaving said box free of any mark, and wherein the reading of the document identifies whether said one box has been marked; said method comprising the steps of:

forming the document by placing characters on a sheet together with said at least one box for receiving a mark;

said characters and said box both being formed of material capable of detection by the same optical scanning means;

determining horizontal and vertical coordinates identifying the location of said one box on the document;

storing said box coordinates in a computer memory;

optically scanning said sheet after said processing thereof by said person who may as part of said processing mark said one box;

said scanning step being carried out by said scanning means which detects both said characters and said one box;

developing from said scanning step a rectilinear set of data bits representing the scanned image of the elements of said characters and said one box including the interior region thereof;

storing in a memory binary representations of said scanned image of said document in the form of said rectilinear set of data bits including pixel data bits representing elements of said characters and said one box;

searching a portion of the set of data bits corresponding to and adjacent the location identified by said stored coordinates identifying the location of said one box to detect the pixel bits representing boundaries of said box;

examining said detected pixel bits to verify that they represent boundaries of a box, thereby locating said box; and examining the data bits representing the interior region within the boundaries of the located box to determine whether a mark is in the box.

2. The method of claim 1, including the step of forming a template sheet from said document;

said template sheet having a box layout identical to that of said document with the characters of said document omitted; and scanning said template sheet to determine said horizontal and vertical coordinates of said box for storage in said memory.

3. The method of claim 1, including the step of presenting on an image display device a visual presentation of said characters and box; and determining said horizontal and vertical coordinates of said box by manipulating cursor means of said image display.

4. The method of claim 1, wherein said document is prepared by means of a laser printer.

5. The method of claim 1, wherein the search for said detected pixel bits representing boundaries of said box is initiated by starting the examination of the scan data bits at a location which is a pre-selected distance away from the location identified by the stored box coordinates, thereby to provide tolerance to allow for paper shrinkage or expansion.

6. The method of claim 1, wherein said document includes a plurality of boxes spaced apart vertically;

the stored vertical coordinate of the lower box of a vertically adjacent pair of said spaced apart boxes being expressed as a difference dimension from the vertical coordinate of the upper box of said pair of boxes.

7. A method of reading documents carrying at least one box formed of material responsive to incident radiation with a spectrum in the human optical range and having boundaries within which a mark is entered by a person who marks the document, and wherein the reading of the document determines whether said box has been marked; said method comprising the steps of:

- determining horizontal and vertical coordinates identifying the location of said one box on the document;
- storing said horizontal and vertical coordinates in a memory;
- optically scanning at least a portion of said document after the marking thereof, said portion including said one box;
- developing from said optical scanning step a rectilinear set of data bits representing a scanned image including said one box;
- storing in a memory binary representations of said scanned image of said document in the form of said rectilinear set of data bits including pixel data bits representing the boundaries of said one box and further data bits representing the interior region within said boundaries;
- searching a portion of said set of data bits corresponding to and adjacent said stored coordinates;
- detecting at least a part of said pixel data bits representing boundaries of said one box;
- examining said detected pixel data bits to verify that they represent a box, thereby to locate said box; and
- examining the data bits within the boundaries of said located box to determine whether they represent a mark in the box.

8. The method of claim 7, wherein the document to be read also is formed with characters of material capable of detection by the same optical sensing means as said box and used in said optical scanning step as aforesaid;

- the scanning of said document serving to produce in said rectilinear data bits a further set of pixel bits representing said characters.

* * * * *